United States Patent

Bauer

Patent Number: 5,078,271
Date of Patent: Jan. 7, 1992

[54] FLAT FILM CASSETTE

[75] Inventor: Walter Bauer, Munich, Fed. Rep. of Germany

[73] Assignee: Agfa-Gevaert AG, Leverkusen, Fed. Rep. of Germany

[21] Appl. No.: 545,342

[22] Filed: Jun. 27, 1990

[30] Foreign Application Priority Data

Jul. 10, 1989 [DE] Fed. Rep. of Germany ....... 3922678

[51] Int. Cl.$^5$ ............................................. B65D 85/48
[52] U.S. Cl. ................................... 206/455; 378/187; 378/188; 354/276
[58] Field of Search ................. 206/449, 455; 378/187, 378/188; 354/276, 278, 279

[56] References Cited

U.S. PATENT DOCUMENTS

| | | | |
|---|---|---|---|
| 1,166,797 | 1/1916 | White | 378/187 |
| 2,810,837 | 10/1957 | Kizaur | 378/188 |
| 3,146,690 | 9/1964 | Hoffmann | 354/279 |
| 3,756,133 | 9/1973 | Tone | 206/455 |
| 3,971,470 | 7/1976 | White | 206/455 |
| 4,248,172 | 2/1981 | Krobel et al. | 206/455 |
| 4,331,236 | 5/1982 | Bauer | 206/455 |
| 4,346,300 | 8/1982 | Turner | 206/455 |
| 4,350,248 | 9/1982 | Bauer | 206/455 |
| 4,467,919 | 8/1984 | Bengtsson et al. | 206/455 |
| 4,618,082 | 10/1986 | Tomidokoro | 206/455 |
| 4,744,100 | 5/1988 | Bauer et al. | 378/187 |
| 4,804,988 | 2/1989 | Hashimoto et al. | 206/455 |
| 4,827,297 | 5/1989 | Douglas | 354/276 |
| 4,889,233 | 12/1989 | Torii | 206/455 |
| 4,903,286 | 2/1990 | Niedospial et al. | 378/187 |

FOREIGN PATENT DOCUMENTS 1924705 12/1969 Fed. Rep. of Germany ...... 354/276

*Primary Examiner*—David T. Fidei
*Attorney, Agent, or Firm*—Michael J. Striker

[57] ABSTRACT

A flat film cassette comprises a lower part, an upper part provided with an illumination window, and an element for turnably connecting the lower part and the upper part with one another. The lower part has a bottom with a peripheral edge for receiving a film, and having a plurality of edge portions including at least two parallel edge portions. A slider is lowerably supported in each of the edge portions of the edge in a springy manner and extends beyond the edge portion so that during closing of the upper part the slider is moved back into the edge portion.

15 Claims, 3 Drawing Sheets

FLAT FILM CASSETTE

BACKGROUND OF THE INVENTION

The present invention relates to a flat film cassette. More particularly, it relates to such a flat film cassette which has a lower part, an upper part provided with an illumination opening, and means for turnably connecting said lower part with said upper part so that the cassette can be opened and closed.

Flat film cassettes of the above mentioned general type are known in the art. A known flat film cassette has the above mentioned upper and lower parts, a light protection plate which is insertable through a slot in the upper part and covers a film in the cassette in a light tight manner, light seals formed between the upper part and the lower part, a hinge turnably connected the upper part and the lower part at their one side, locking elements provided at the opposite side of the upper part and lower part. The lower part has a firm bottom with a peripheral edge for receiving the film, while the inner surface of the upper part has a frame which surrounds the illumination window, is elastic and pressed in the closed condition of the cassette against the firm bottom of the lower part.

Such a flat film cassette is disclosed for example in the German document DE-PS 3,040,819. In this cassette the edge which forms together with the bottom of the lower part a film shooting region is only insignificantly higher than the thickness of the flat film. When such cassettes are loaded in known automatic loading devices, then due to a bulging of the film toward the bottom, the film edges are lifted and extend over the edge. An automatically inserted film can project beyond the film shooting region and therefore lie in the cassette in non-accurate manner so as to cause defective shooting.

SUMMARY OF THE INVENTION

Accordingly, it is an object of the present invention to provide a flat film cassette which avoids the disadvantages of the prior art.

More particularly, it is an object of the present invention to provide a flat film cassette which is designed so that a curved flat film which is automatically supplied into the open cassette will inevitably lie inside the film shooting region as required.

In keeping with these objects and with others which will become apparent hereinafter, one feature of the present invention resides, briefly stated, in a flat film cassette in which a slider is arranged in each of two parallel side portion of the edge in a springy manner so that it projects beyond the side portion of the edge and is lowerable into it, and during closing of the upper part is pressed by the upper part into the respective edge portion.

When the upwardly extending slider projects in the open cassette parallel to the film inserting direction over the edge, the upwardly bent film edges cannot slide over the edge or the slider and therefore the film is guided properly into the film shooting region of the lower part and laid in it in a prescribed manner.

In accordance with another feature of the present invention, the slider extends over the whole length of the side edge portion.

Still another feature of the present invention is that the slider is arranged in the side edge portions which extend perpendicular to the hinge connecting the upper and lower parts with one another.

A further feature of the present invention is that a receiving cup is arranged on the upper part of the cassette for receiving spring means which engage the sliders.

The spring means can include several springs distributed over the length of the side edge portion.

Each side edge portion can be provided with a guiding slot for receiving the slider and extending over the length of the slider.

Limiting of the movement of the slider and the springs in the displacement direction can be achieved for example by at least two longitudinal openings provided in the slider, and a holding pin extending into the openings from the side edge portion.

Finally, the sliders can be provided also at one or two other edge portions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
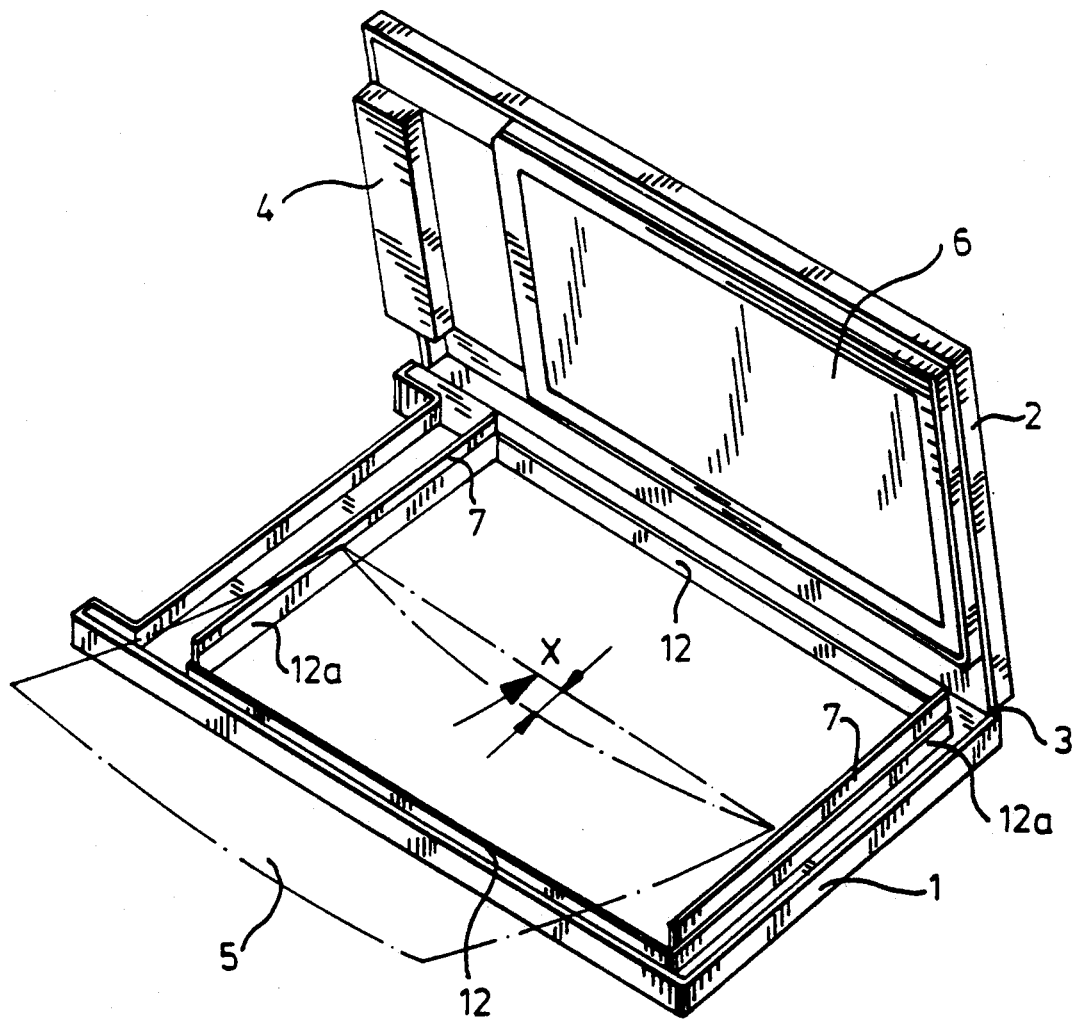
FIG. 1 is a perspective view showing a flat film cassette in accordance with the present invention, in open condition.
Figure 2:
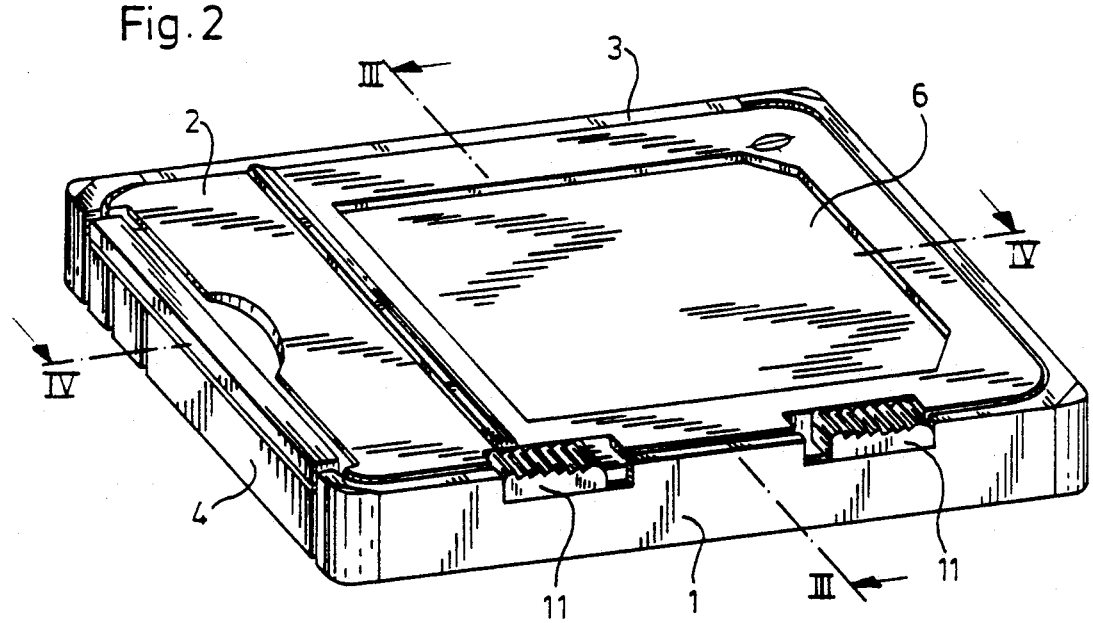
FIG. 2 is a perspective view of the inventive flat film cassette of FIG. 1 in closed condition.
Figure 3:
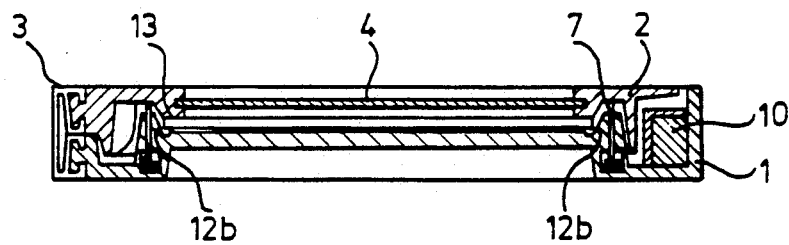
FIG. 3 is a view showing a section taken along the line III in FIG. 2.
Figure 4:
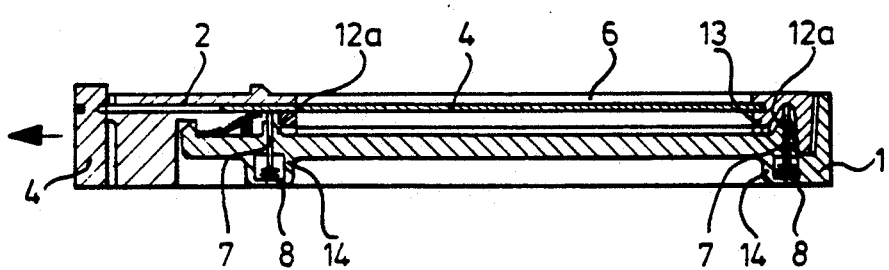
FIG. 4 is a view showing a section taken along the line IV—IV in FIG. 2.
Figure 5:
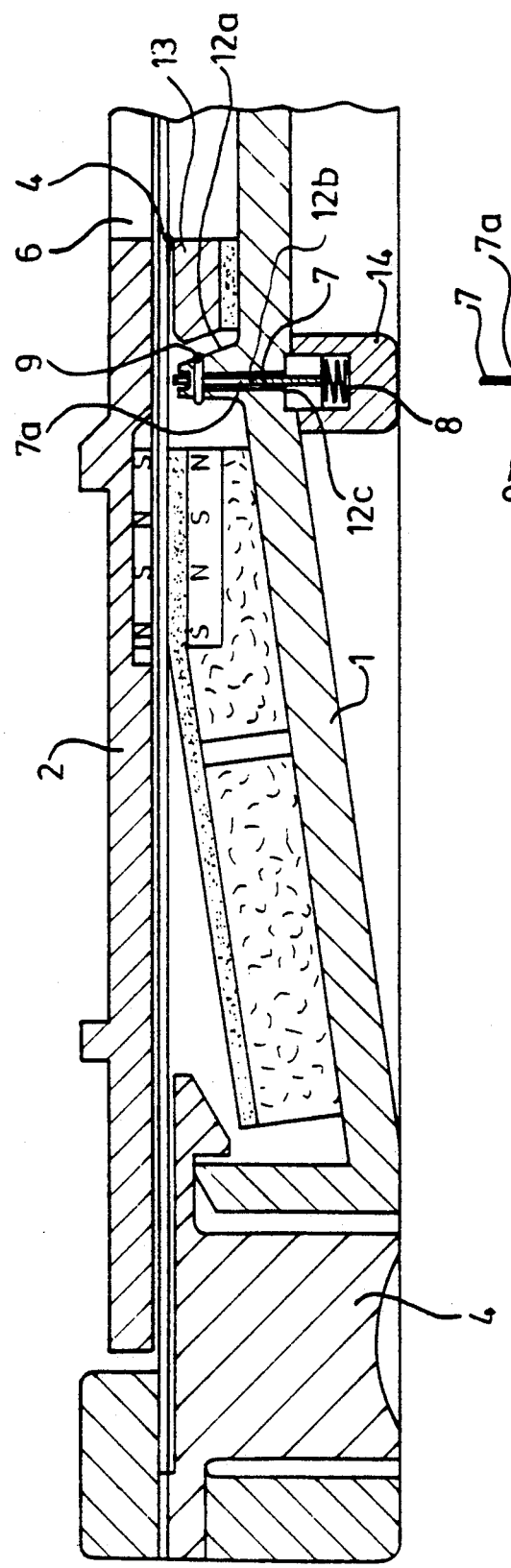
FIG. 5 is an enlarged view of the cassette of FIG. 2.
Figure 6:
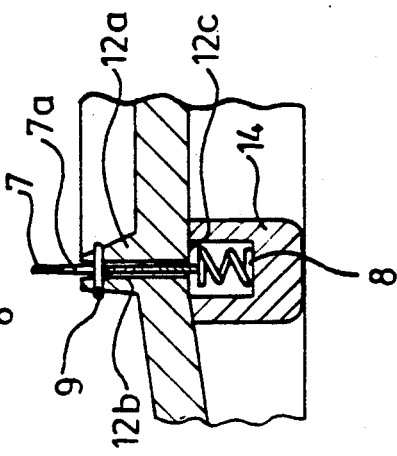
FIG. 6 is a fragment of the cassette of FIG. 2.

The new flat film cassette in accordance with the present invention is shown in the drawings. Its parts which are not important for the present invention are disclosed in the German document DE-PS 3,040,819 which is incorporated here as a reference. Important parts of the inventive flat film cassette are described hereinbelow. As shown in the drawings, the cassette has a lower part identified with reference numeral 1 and simultaneously forming a cassette bottom for placing a film. It further has an upper part identified with reference numeral 2 and provided with an illumination window 6. A light protection plate 4 is displaceable through a slot in the upper part 2 in front of the illumination opening 6 and withdrawable for illuminating the film. Also, light seals are provided between the upper part and the lower part of the film cassette.

The upper part and the lower part are turnably connected with one another at their one side by a hinge 3. Preferably, the hinge 3 extends parallel to the movement direction of the light protection plate 4. Locking elements 11 for the upper part and lower part are arranged at the side opposite t the hinge 3. The lower part 1 simultaneously forms a film support which is limited by a peripheral edge 12. The edge 12 which limits the film shooting region is only as high as the thickness of a flat film 5 to be inserted, which is frequently bent so that during automatic insertion in the cassette its edges are displaced relative to the film shooting region and can abut against the edge 12, as can be seen from FIG. 1. This is eliminated by the present invention which is described hereinbelow. Naturally, an elastic frame 13 is provided. It presses the film 5 against the bottom in the closed cassette.

The edge 12 has two parallel side portions 12a. A slider 7 projecting beyond the edge portion 12a is lowerably supported in the respective edge portion 12a in a springy manner. During closing of the upper part it is pressed back by the upper part into the edge portion 12a. Each slider 7 extends preferably over the whole length of the edge portion 12a. Since during automatic insertion of a flat or sheet film 5 it is brought perpendicularly to the direction of the hinge 3, the slider 7 are arranged in the edge portions 12a which are perpendicular to the hinge.

A receiving part 14 for a spring 8 which engages the slider 7 is formed in the lower part 1 under each edge edge portion 12a. Its receiving cavity extends preferably over the length of the edge portion 12a, so that several springs can be uniformly distributed over the length of the side edge, to provide a uniform upward pressing of the slider 7. Naturally, the edge portions 12a have a guiding slot 12b provided for a slider 7 and extending over the whole length of the slider.

For supporting the slider 7 and the springs 8, basically any arrangement known in precision mechanics can be used. It is advantageous when at least two longitudinal openings 7a are provided in the displacement direction in the slider 7, for displaceably supporting the slider 7 in the displacement direction. A holding or guiding pin 9 arranged on the side edge 12a extend through the longitudinal openings 7a.

In accordance with a further embodiment of the present invention, the rear and/or front edge portions 12b can also be provided each with an additional slider 7 which is supported in the same manner as slider 7 in the edge portions 12a.

It will be understood that each of the elements described above, or two or more together, may also find a useful application in other types of constructions differing from the types described above.

While the invention has been illustrated and described as embodied in a flat film cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A flat film cassette, comprising a lower part; an upper part provided with an illumination window; means for hingedly connecting said lower part and said upper part, said lower part having a bottom with a peripheral edge for receiving a film, said edge having a plurality of side portions including at least two parallel side portions; and means for guiding a film during its insertion into the cassette and formed by a slider projecting in a direction of insertion of a film into the cassette and lowerably located in each of said side portions of said edge with spring-biasing so as to extend upwardly beyond said side portion so that during closing of said upper part said slider is moved downwardly back into each said side portion.

2. A flat film cassette as defined in claim 1; and further comprising a light protection plate adapted to cover a film in the cassette.

3. A flat film cassette as defined in claim 1; and further comprising light seals provided between said upper part and said lower part 4. A flat film cassette as defined in claim 1, wherein said connecting means include a hinge provided at one side of said upper part and said lower part and hingedly connecting said parts.

5. A flat film cassette as defined in claim 4; and further comprising locking means for locking said upper and said lower part with one another and arranged at a side opposite to said hinge.

6. A flat film cassette as defined in claim 1, wherein said upper part has an inner surface; and further comprising a frame arranged on said inner surface of said upper part around said illumination window, said frame being peripherally closed and elastic and pressing in a closed condition of the cassette against said bottom.

7. A flat film cassette as defined in claim 1, wherein each of said side portions has a predetermined length, each of said sliders extending over the whole length of a respective one of said side portions.

8. A flat film cassette as defined in claim 1, wherein said connecting means include a hinge turnably connecting said upper part and said lower part, said two parallel edge portions extending perpendicular to said hinge so that said sliders also extend perpendicular to said hinge.

9. A flat film cassette as defined in claim 1; and further comprising spring means engaging and spring-biasing said sliders.

10. A flat film cassette as defined in claim 9; and further comprising receiving means for receiving said springs for spring-biasing said sliders, said receiving means being provided on said lower part under said two parallel side portions.

11. A flat film cassette as defined in claim 9, wherein each of said two parallel side portions has a predetermined length, said spring means including a plurality of springs distributed over said length of each of said two parallel side portions.

12. A flat film cassette as defined in claim 1, wherein said sliders have a predetermined length, each of said two parallel side portions having a guiding slot provided for a respective one of said sliders and extending over its length.

13. A flat film cassette as defined in claim 1; and further comprising means for limiting movement of said slider and including at least two elongated openings provided in said slider and a pin arranged on each of said two parallel side portions.

14. A flat film cassette as defined in claim 9; and further comprising means for limiting movement of said slider and including at least two elongated openings provided in said slider and a pin arranged on each of said two parallel side portions.

15. A flat film cassette as defined in claim 1, wherein said side portions include a front portion and a rear portion; and further comprising a further such slider provided in at least one of said front edge portion and rear edge portion.

* * * * *